United States Patent Office 3,533,963
Patented Oct. 13, 1970

3,533,963
CATALYTIC COMPOSITIONS USED IN STEAM
REFORMING AND METHODS FOR THEIR
PRODUCTION
Michel Senes, Saint-Nazaire, Pierre Lhonore, Douai,
Jean P. Gignier, Meudon, Jacques Quibel, Paris, and
Jean Housset, Saint-Nazaire, France, assignors to La
Societe Chimique de la Grande Paroisse, Azote et
Produits Chimiques
No Drawing. Continuation-in-part of application Ser. No.
608,976, Jan. 13, 1967. This application Dec. 11, 1967,
Ser. No. 689,246
Claims priority, application France, Oct. 20, 1966,
80,960; Mar. 1, 1967, 96,921
Int. Cl. B01j 11/06
U.S. Cl. 252—465
16 Claims

ABSTRACT OF THE DISCLOSURE

Catalytic compositions having a restricted porosity for use in the steam reforming of saturated or unsaturated homologues of methane, such as light petroleum fractions, containing nickel as the active metal, with a nickel content, calculated as nickel oxide, between 5% and 20%, combined with a crystalline structure with a refractory carrier containing oxides such as magnesia, alumina, lime and zirconia, with the magnesia content being between 50–60% by weight, and at most 20% alumina by weight. Stabilizing elements such as chromium, potassium and iron can be included. The methods for the production of such compounds is also disclosed.

This application is a continuation-in-part of copending application Ser. No. 608,976 filed Jan. 13, 1967, and now abandoned.

This invention relates to the new stable catalytic compositions which can be used particularly in the steam reforming of optionally unsaturated higher homologues of methane with a boiling point below 350° C., such as the light petroleum oils.

The industrial application of steam reforming to hydrocarbons encounters certain difficulties, particularly those arising from the formation of carbon black within the catalytic composition and which destroys it.

Different solutions to these difficulties have been proposed, and particularly that which consists in doping the catalysts initially provided for the treatment of the natural gas by addition of promoters, which reduce the risks of formation of carbon black. Among these promoters are the alkali metals, which are introduced in various forms, particularly potassium.

Usually, in the case where the alkali promoter is readily soluble in water, it is introduced into the catalyst by impregnation, preferably before the reduction of the active metal oxide. In the contrary case, the alkali compound is introduced into the catalytic composition before drying. The known catalytic compositions are generally obtained by the material of the refractory support being impregnated with a soluble salt of the active metal, for example by being brought into suspension, and then by filtration, washing, drying into suspension, and then by filtration, washing, drying and calcination, for example at 400–500° C.

Using catalysts of this known type, it is found after operating for a few days that the promoter leaves the catalyst, entrained by the reaction mixture, and then at a later stage, one or more parts of the constituents of the catalyst, contributing to its mechanical resistance, are eliminated and are deposited in the pipe conduits and particularly in the nests of tubes by disintegration and formation of carbon.

A class of catalysts has been found according to the invention which has the characteristics as regards resistance to the reaction conditions which have never been equalled and which permit the prior disadvantages to be overcome.

The particular resistance of these compositions is due to the nature of their refractory constituents and to the nature of their surfaces, which does not favor the formation of carbon black.

It has been established that lime, zirconia, magnesia and the oxides of iron and chromium are of very great importance in the catalyst compositions for reforming purposes.

These new stable catalyst compositions having limited porosity are characterized in one embodiment of the invention in that they contain nickel as active metal, the content calculated as nickel oxide, being between 10 and 20%, combined in crystallographic structure with a refractory support, formed particularly by oxides such as magnesium oxide, aluminum oxide, calcium oxide and zirconium dioxide, in which the magnesium oxide content is between 50 and 60% by weight, and represents the largest proportion of these oxides, the content of aluminum oxide being at most equal to 20% by weight.

According to a preferred embodiment of the invention, these compositions contain stabilizing elements, such as chromium, potassium and iron. These elements can be introduced in quantities such that the content of chromium, expressed as chromic oxide, is between 0.4 and 2% by weight, while the content of iron expressed as iron oxides, is between 1.5 and 5%. The potassium is preferably introduced in the form of potassium hydroxide, the content of which is at most equal to 2 and is preferably between 0.1 and 0.5% by weight, and more particularly between 0.2 and 0.4%.

It has been established that the potassium can be replaced by an alkaline earth metal, such as barium, and in this case, the new compositions are characterized in that the content of barium, expressed as barium oxide, is below 2% and preferably in the region of 1%. Barium plays a particularly important part in the inhibition of the carbon black. The two elements may be present simultaneously in the catalyst.

Certain of these compositions contain sodium oxide; the content of this oxide is below 1% and preferably it is between 0.2 and 0.5%.

It has also been pointed out that, in the iron oxides, the preponderance of the magnetic oxide $Fe_3O_4$ increases the contraction of the composition and acts on the porosity. A ratio between the content of $Fe_3O_4$ and the content of $Fe_2O_3$ of approximately 3 is particularly advantageous, because it yields a higher contraction close to 5% as compared with that obtained with the compositions in which this ratio is in the region of or below 1, for a similar formation temperature, and thus of acting on the porosity.

The favorable effect of a content of 1 to 3% of titanium oxides on the inhibition of the carbon deposits has also been discovered. This characteristic of the new compositions is particularly interesting when treating heavy hydrocarbons or when the rates of heat transfer are very considerable, which are favorable to a violent cracking.

According to another embodiment of the invention, the nickel content can be lowered, calculated as nickel oxide, to between 5 and 10%. These compositions, although less active than the compositions with a higher nickel content, are useful for the treatment of heavy hydrocarbons.

These new catalytic compositions are prepared in accordance with a novel process, which for this reason forms part of the invention, and yields combined elements which have a very high stability.

This process is characterized in that the different elements constituting the catalyst composition are combined by solid solution diffused in the composition, preferably effected by sintering at a high temperature, which is at least equal to 1300° C. The linear contraction is in the region of 27%.

The remarkable stability of the combined elements is due to the fact that a state of equilibrium is reached between the various combined elements the excess being eliminated in gaseous form at the time of sintering. This process permits bonds to be established between the elements of the composition, said bonds being resistant to destruction by the high expansion of the reforming reaction, and this represents a remarkable advantage over the bonds obtained by the impregnation methods.

This particular method of preparation permits the introduction of large quantities of magnesium oxide, the influence of which is favorable to the resistance of the catalyst compositions, and a certain proportion of aluminum oxide, without increasing the porosity thereof, while obtaining an effective refractory support.

The surface of the new sintered catalyst composition with a porosity which has been limited by the sintering does not favor the formation of carbon black. This very low porosity structure of the catalyst counteracts the deposition of the carbon black.

The sintering has an effect on the specific surface area, and it has been observed, taking into account the combined elements in the crystallographic structure, that the specific surface area which is between approximately 0.02 and 1 m.$^2$/g. is the most advantageous. There is no change in the specific surface area and of the distribution of the porosity, which remains very homogeneous, even under difficult temperature and reaction conditions.

The sintered catalysts according to the invention are particularly suitable for the hydrocarbon reforming processes which comprise an initiation of the reaction at temperature of the order of 300 to 500° C., under all pressures, particularly under an effective pressure of 1 to 70 bars, with a steam ratio ($H_2O/C$ in moles) which is between 1 and 6, in the presence or absence of air in the zone for entry of the gases to be reformed. The quantity of air intended to reduce the residual hydrocarbon content at the outlet is preferably between 0.01 and 0.5 m.$^3$ of air per litre of naphtha.

These new sintered catalyst compositions can be used in the reforming entry zone, possibly followed by the catalysts described in U.S. application Ser. No. 485,366 filed Sept. 7, 1965.

These sintered compositions are such that their use in a reforming furnace is not reduced by the dangers of carbon formation, when this latter, formed by an error in the conduction of the process, for example, lack of steam, can be resorbed by passage of super-heated steam, to which a little air is added if necessary, without destroying the catalyst.

Examples of sintered catalyst compositions which illustrate the invention in non-limiting manner are given below.

EXAMPLE 1

The catalysts referred to as A and B are prepared by combination of the constituents by solid solution diffused in the mass, using sintering at a high temperature, which is at least 1300° C.

These two sintered catalysts have the following compositions by weight:

|  | A | B |
|---|---|---|
| NiO | 15 | 15 |
| MgO | 52.34 | 56 |
| $Al_2O_3$ | 15.12 | 20 |
| $ZrO_2$ | 1.52 | 1.5 |
| CaO | 7.69 | 2 |
| $Fe_2O_3$ | 3.38 | 0.7 |
| $Fe_3O_4$ | 0.95 | 1 |
| $CrO_3$ | 0.47 | 0.7 |
| KOH | 2 | 2 |

The complement to 1000% of these compositions can be made up by titanium oxide and vanadium oxide, and sometimes by very small quantities of silica.

EXAMPLE 2

Under a pressure of 30 bars, using the composition A of the foregoing example, with a light petroleum fraction of the empirical formula $C_{6.17}H_{14.20}$, with a boiling point which is between 40 and 140° C., containing 2 p.p.m. of sulphur, the following tests are carried out as set out in Table I.

TABLE I

| | | | | |
|---|---|---|---|---|
| Rate of flow of light petroleum oil in litres | 45 | 50 | 60 | 60 |
| Rate of flow of $N_2+3H_2$ for hydrogenation of the sulphur m.$^3$ (at n.t.p.)/h | 7 | 12 | 3 | 0 |
| Corrected rate of flow of $H_2O$ m.$^3$ (at n.t.p.)/h | 180 | 180 | 218 | 180 |
| Steam ratio $H_2O/C$ | 3.8 | 3.5 | 3.4 | 2.8 |
| Pressures on entering the tube in bars | 30 | 29.2 | 29.1 | 29.1 |
| Pressure drop in the tube in bars | 1 | 1.1 | 1.1 | 1.1 |
| Temperature on entry into the tube, ° C | 520 | 520 | 520 | 525 |
| Mean skin temperature of the tube, ° C | 870 | 880 | 865 | 860 |
| Composition of the departing gas, percent (calculated as dry gas): | | | | |
| CO | 9.5 | 10.8 | 9.7 | 11.5 |
| $CO_2$ | 14.5 | 12.5 | 14.6 | 13.4 |
| $CH_4$ | 7.5 | 7.15 | 7.3 | 8.7 |
| $C_2H_6$ | 0.6 | 0 | 0.5 | 0.9 |
| $H_2$ | 66.4 | 67.8 | 76.5 | 65.5 |
| $N_2$ | 1.5 | 1.75 | 0.4 | 0 |
| Corresponding outlet temperature of the gas, ° C | 780 | 790 | 780 | 780 |

EXAMPLE 3

Under 10 bars, in an industrial installation comprising 40 tubes of an effective length of 6.5 m., containing 1700 l. of catalyst, the catalyst of composition A is introduced into the first three metres, while a catalyst of the class forming the subject of the previously mentioned U.S. application Ser. No. 485,366 filed Sept. 7, 1965, is introduced into the remainder of the tube.

The results obtained with a light petroleum oil containing 3 p.p.m. of sulphur are as follows:

Rate of flow of light oil in litres—1100 l./hour
Rate of flow $N_2+3H_2$—80 m.$^3$ (at n.t.p.)/h.
Rate of flow of air—100 m.$^3$ (at n.t.p.)/h.
Ratio $H_2O/C$—4
Entry pressure—10 bars
Pressure drop—1.4 bars
Inlet temperature—320° C.
Mean skin temperature of tube—850° C.
Composition of the departing gas in percent (calculated dry)

| | |
|---|---|
| CO | 15.4 |
| $CO_2$ | 8.75 |
| $CH_4$ | 4.95 |
| $C_2H_6$ | 0.90 |
| $C_2H_4$ | 0.20 |
| $H_2$ | 65.55 |
| $N_2$ | 4.25 |

Outlet temperature of gas 810° C.

In Example 1, the catalyst functioned for 3000 hours without any difficulty. After this time, the product was withdrawn for analysis purposes and it was found that it did not contain any carbon, that it had not lost any KOH and silica or any adjuvant and that its physical structure had remained unchanged. Several times the steam was stopped in order to cause the formation of coke and each time it was possible by passage of steam and a little air, to remove all the deposited carbon. This was checked by observing the pressure drop.

In Example 2, the catalyst functioned for 4000 hours without any degradation being found in its chemical composition and its physical structure.

EXAMPLE 4

The catalyst bearing the reference C is prepared by first of all producing the mixture of the nickel, introduced in the form of nickel oxide, iron oxides, particularly ferric oxide $Fe_3O_4$ and refractory oxides. The chromium oxide in the form of a soluble salt and also the potassium oxide in the form of potassium hydroxide are introduced in solution into the water intended to form a paste of the mixture of the active metal oxide and the other oxides. After the paste has been formed into pellets, rings or cylinders, the catalyst composition is subjected to a sintering at a temperature at least equal to 1300° C. The linear contraction is 24% after complete combination of all the elements in solid solution.

According to a variant, the nickel could be introduced in soluble salt form in solution in the water for forming a paste of the refractory oxides.

This catalyst composition C has the following composition by weight:

| | | |
|---|---|---|
| Nickel | NiO | 15 |
| Magnesia | MgO | 50 |
| Alumina | $Al_2O_3$ | 20 |
| Zirconia | $ZrO_2$ | 1.5 |
| Lime | CaO | 7 |
| Ferrous oxide | $Fe_2O_3$ | 1 |
| Ferride oxide | $Fe_3O_4$ | 3 |
| Chromium oxide | $CrO_3$ | 0.5 |
| Titanium oxide | TiO | 1.4 |
| Potash | $K_2O$ | 0.4 |
| Sodium oxide | $Na_2O$ | 0.2 |

Under a pressure of 30 bars, using the above catalyst composition, for the reforming of a light petroleum fraction of empirical formula $C_{6.17}H_{14.20}$, with a boiling point which is between 40 and 140° C., and containing 2 p.p.m. of sulphur, results comparable to those of the foregoing Example 2 are obtained. With a rate of flow of light petroleum oil of 45 litres, a steam proportion $H_2O/C$ of 3.8 and inlet and outlet temperatures of 520 and 780° C., respectively, the composition of the departing gas, calculated as dry gas, is as follows:

| | |
|---|---|
| CO | 9.5 |
| $CO_2$ | 14.5 |
| $CH_4$ | 7.5 |
| $C_2H_6$ | 0.6 |
| $H_2$ | 66.4 |
| $N_2$ | 1.5 |

With a rate of flow of oil of 60 litres, and a steam ratio of 3.4, this gas composition is:

| | |
|---|---|
| CO | 11.5 |
| $CO_2$ | 13.4 |
| $CH_4$ | 8.7 |
| $C_2H_6$ | 0.9 |
| $H_2$ | 65.5 |
| $N_2$ | 0 |

This catalyst composition has a life increased by 30% with respect to that of the compositions A and B. The catalyst composition C operated for 25,000 hours without any degradation.

EXAMPLE 5

Catalyst composition D:

| | |
|---|---|
| NiO | 15 |
| MgO | 51.8 |
| $Al_2O_3$ | 19 |
| $ZrO_2$ | 1.5 |
| CaO | 7 |
| $Fe_2O_3$ | 1 |
| $Fe_3O_4$ | 3 |
| $CrO_3$ | 0.5 |
| BaO | 1 |
| $Na_2O$ | 0.2 |

The catalyst composition D is useful in the reforming of a light petroleum fraction similar to the preceding examples, under the same conditions as regards rate of flow, temperature, pressure and steam ratio, and leads to results substantially similar to those obtained with the composition C. The composition C also has exceptional resistance characteristics under the reaction conditions, higher by about 20% than those of the compositions in the preceding examples.

EXAMPLE 6

Composition E:

| | |
|---|---|
| NiO | 6 |
| MgO | 60 |
| $Al_2O_3$ | 20 |
| $ZrO_2$ | 1.5 |
| CaO | 7.4 |
| $Fe_2O_3$ | 1 |
| $Fe_3O_4$ | 3 |
| $CrO_3$ | 0.3 |
| $K_2O$ | 0.4 |
| $Na_2O$ | 0.2 |

This composition is prepared, as in the preceding composition, following the technique of Example 4, by sintering at high temperature.

When using the composition E in the reforming treatment of heavy hydrocarbons with a rate of flow of 45 litres, a pressure on entry into the reforming tube of 30 bars, with a steam ratio $H_2O/C$ of 3.8 and inlet and outlet temperatures of 520 and 780° C. respectively, the composition of departing gas obtained is:

| | |
|---|---|
| CO | 9.5 |
| $CO_2$ | 13 |
| $CH_4$ | 15 |
| $C_2H_6$ | 0.6 |
| $H_2$ | 60.4 |
| $N_2$ | 1.5 |

It will be obvious to those skilled in the art that various changes may be made without departing from the scope of the invention and the invention is not to be considered limited to what is described in the specification.

What we claim is:

1. A stable catalytic composition with restricted porosity, suitable for use in the steam reforming of optionally unsaturated higher homologues of methane with a boiling point lower than 350° C., comprising:
    a diffused solid solution of nickel oxide as active metal and a refractory support of oxides combined in crystallographic structure having a low porosity and a specific surface area of between 0.02 and 1 m.$^2$/gm.;
    said oxides of said refractory support comprising mixtures of oxides selected from the group consisting of magnesium oxide, aluminum oxide, calcium oxide, iron oxide and zirconium dioxide; and
    wherein said solid solution composition contains between 5 and 20% by weight of said nickel oxide; between 50 and 60% by weight of said magnesium oxide; between 1.5 and 5% iron oxide and at most 20% by weight of said aluminum oxide.

2. A process for forming the stable catalytic composition of claim 1 comprising:
    mixing a nickel compound with a mixture of oxides selected from the group consisting of magnesium oxide, aluminum oxide, calcium oxide and zirconium dioxide, the proportion of mixed components being such that the mixture contains between 5 and 20% by weight of said nickel, calculated as nickel oxide; between 50 and 60% by weight of said magnesium oxide; and at most 20% by weight of said aluminum oxide;
    and sintering said mixture at a temperature at least equal to 1300° C. to obtain a solid solution.

3. A catalytic composition according to claim 1, characterized in that it further contains stabilizing oxides selected from the group consisting of chromium, potassium and barium oxides.

4. A catalytic composition according to claim 3, characterized in that it contains no more than 2% of potassium oxide.

5. A catalytic composition according to claim 3, characterized in that it contains between 0.2 and 0.4% of potassium oxide.

6. A catalytic composition according to claim 3, characterized in that one of the stabilizing oxides is barium oxide, and the content thereof, is less than 2%.

7. A catalytic composition according to claim 6, characterized in that the content of barium oxide is approximately 1%.

8. A catalytic composition according to claim 3, characterized in that it further contains less than 1% of sodium oxide.

9. A catalytic composition according to claim 8, characterized in the content of sodium oxide is between 0.2 and 0.5%.

10. A catalytic composition according to claim 1, characterized in that the ratio of $Fe_3O_4/Fe_2O_3$ is approximately 3.

11. A catalytic composition according to claim 3, characterized in that the content of chromium oxide is between 0.4 and 2% by weight.

12. A catalytic composition according to claim 3, characterized in that the content of titanium oxides is between 1 and 3% by weight.

13. A catalytic composition according to claim 1, characterized in that the nickel oxide content is between 10 and 20%.

14. A catalytic composition according to claim 1, characterized in that the nickel oxide content is between 5 and 10%.

15. A catalytic composition according to claim 1 characterized in that the solid solution by diffusion in the mass is obtained by sintering at temperatures which are at least equal to 1300° C.

16. A catalytic composition according to claim 1 having the following composition as oxides combined in crystallographic structure:

| | Percent |
|---|---|
| Nickel oxide | 5–20 |
| Magnesium oxide | 50–60 |
| Aluminum oxide | At most 20 |
| Zirconium oxide | Approximately 1.5 |
| Calcium oxide | At most 7.4 |
| $Fe_2O_3 + Fe_3O_4$ | 1.5–5 |
| Chromium oxide | 0.4–2 |
| Potassium oxide | At most 2 |
| Sodium oxide | At most 1 |
| Titanium oxide | At most 3 |
| Barium oxide | At most 2 |

References Cited

UNITED STATES PATENTS

| | | | |
|---|---|---|---|
| 2,125,743 | 8/1938 | Sweeney | 23—212 |
| 2,137,101 | 11/1938 | Spicer | 23—233 |
| 2,229,199 | 1/1941 | Voorhies | 252—212 |
| 3,391,089 | 7/1968 | Mayland | 252—473 |
| 3,186,957 | 6/1965 | Styles | 252—466 |
| 2,538,959 | 1/1951 | Ballard | 25—156 |
| 3,379,523 | 4/1968 | Chaklader | 75—206 |
| 3,205,182 | 9/1965 | Padovani | 252—454 |

DANIEL E. WYMAN, Primary Examiner

P. M. FRENCH, Assistant Examiner

U.S. Cl. X.R.

252—466